United States Patent [19]

Stinessen

[11] Patent Number: 5,398,762
[45] Date of Patent: Mar. 21, 1995

[54] COMPRESSOR SYSTEM IN A SUBSEA STATION FOR TRANSPORTING A WELL STREAM

[75] Inventor: Kjell O. Stinessen, Oslo, Norway

[73] Assignee: Kvaerner Rosenberg a.s. Kvaerner Kvaerner Subsea Contracting, Oslo, Norway

[21] Appl. No.: 98,369
[22] PCT Filed: Feb. 6, 1992
[86] PCT No.: PCT/NO92/00024
§ 371 Date: Aug. 2, 1993
§ 102(e) Date: Aug. 2, 1993
[87] PCT Pub. No.: WO92/14062
PCT Pub. Date: Aug. 20, 1992

[30] Foreign Application Priority Data
Feb. 8, 1991 [NO] Norway .................. 910500

[51] Int. Cl.⁶ .................................. E21B 43/01
[52] U.S. Cl. .................................. 166/356; 166/357; 55/218
[58] Field of Search .............. 166/105.5, 344, 356, 166/357, 105

[56] References Cited

U.S. PATENT DOCUMENTS

| | | | |
|---|---|---|---|
| 2,190,104 | 2/1940 | McCoy | 166/105.5 |
| 3,503,443 | 3/1970 | Blanding et al. | 166/344 |
| 3,556,218 | 1/1971 | Talley, Jr. et al. | 166/357 X |
| 3,643,736 | 2/1972 | Talley, Jr. | 166/267 |
| 4,762,180 | 8/1988 | Wybro et al. | 166/356 X |
| 4,913,590 | 4/1990 | Svenning et al. | 166/356 X |
| 5,044,440 | 3/1991 | Stinessen et al. | |
| 5,154,741 | 10/1992 | da Costa Filho | 166/357 X |

FOREIGN PATENT DOCUMENTS
162782  6/1989  Norway .

Primary Examiner—Ramon S. Britts
Assistant Examiner—Frank S. Tsay
Attorney, Agent, or Firm—Merchant & Gould Smith, Edell, Welter & Schmidt

[57] ABSTRACT

In a subsea station for transporting a well stream, comprising a compressor (12, 13) with a motor (8) in a common drive atmosphere within a pressure shell (21), and provided with a lube oil circuit comprising a lube oil sump (25) open to the drive atmosphere in the pressure shell, a lube oil pump (27), bearings (19, 20, 14, 15, 16) in the motor (8) and compressor (11, 12, 13), and a lube oil flow line (29) to the bearings, said lube oil circuit is connected with a lube oil supply on the shore/platform. The lube oil circuit may be integrated in a lube oil flow line (28, 33) from the onshore/platform-based lube oil supply and back to the onshore/platform-based lube oil supply, or the lube oil circuit may be connected with a lube oil line (28) from the onshore/platform-based lube oil supply, and in the lube oil sump may be connected with the gas chamber through an overflow pipe (30) from the lube oil sump (25) and to the gas chamber (4).

5 Claims, 2 Drawing Sheets

COMPRESSOR SYSTEM IN A SUBSEA STATION FOR TRANSPORTING A WELL STREAM

The invention relates to a compressor system in a subsea station for transporting a well stream, comprising a compressor with a motor in a common drive atmosphere within a pressure shell, a gas chamber and a gas suction line between the gas chamber and an inlet in the compressor, a gas line between the gas chamber and the drive atmosphere within the pressure shell, and a lube oil circuit comprising a lube oil sump open to the drive atmosphere, a lube oil pump, bearings in the motor and compressor, and a lube oil line to the bearings.

The invention has been developed particularly in connection with the development of a subsea station for pumping a well stream. Oil and gas production at sea usually takes place today in the following manner:

Production wells are drilled from a platform down into the hydrocarbon reservoir. The platform is positioned above wave height on a base structure standing on the ocean floor or floating on the surface of the sea. The wellhead valves, which shut off the reservoir pressure, are placed on the platform, usually directly above the production wells.

The oil, which is found under high pressure in the hydrocarbon reservoir, contains large amounts of dissolved gas. The oil's capacity to retain the dissolved gas decreases with lowered pressure and rising temperature. When the oil flows up through the production well from the reservoir and past the wellhead valve on the platform, whereby the pressure decreases, gas is then given off from the oil. A mixture of oil and gas (actually a mixture of liquid (oil/water) and gas) will therefore emerge on the top side of the well head valve.

This mixture of liquid and gas is conducted to a processing plant, generally located on the platform. The function of the processing plant is primarily to separate oil and gas and to render the oil suitable for transport, and the gas suitable for transport or for return to the reservoir.

Since this process requires energy, and hydrocarbons are flammable, there must be built a number of auxiliary functions and emergency systems around the processing plant. In addition, operation of the processing and the auxiliary and emergency systems requires manpower which, in turn, requires housing accommodations and numerous other functions. For this reason, the structures become large and expensive, both in terms of investment and operation. At greater sea depths, the cost problems are aggravated when the platform and its processing plant are to stand on an expensive base structure either floating or anchored to the seabed.

Presently there are major development projects underway with the aim of reducing these costs. These include technology developed to enable placement of the wellhead valves on the ocean floor - a so-called subsea production plant. This has major economic significance because the number of platforms that are necessary to drain a hydrocarbon reservoir may thereby be reduced. A subsea production plant is situated above an area of the hydrocarbon reservoir that cannot be reached with production wells from the platform.

The production wells in a subsea production plant are drilled from floating or jack-up drilling vessels. Oil and gas from the hydrocarbon reservoir flow upward and past the wellhead valves on the ocean floor and then proceed as a two-phase flow (oil and gas in mixture) in a pipeline connecting the subsea production plant with the platform. Such a two-phase flow results in the formation of liquid slugs that produce powerful fluid knocks, uncontrolled flow conditions and a severe pressure drop within the pipeline. Therefore, the distance between the subsea production plant and the platform cannot be great. A practical limit is currently considered to be about 15 kilometers.

Technical solutions capable of increasing this distance would have major economic potential. Their most extreme consequence would be to render the platform superfluous, with the well head valves standing on the ocean floor at the hydrocarbon reservoir and the processing, auxiliary and emergency facilities being located on shore.

Work is also currently in progress on major development projects to solve the problem of transporting the oil/gas mixture across great distances. Some of these projects have the objective of supplying pressure to the oil/gas mixture by placing two-phase pumps on the ocean floor thereby compensating the pressure decrease. Other projects aim at separating oil and gas on the ocean floor and then pumping oil and gas in their respective pipelines to a processing plant. 011 and gas are thereby imparted with the necessary transport energy for their effective transport further on to the receiving station. Liquid and gas are each conducted in a separate pipeline, but it would be possible to run the liquid and gas pipelines together in a multi-phase transport conduit if this were found to be the optimal solution.

The production from a plurality of wells may be collected and transported further in a common stream. One problem in this connection is the occurrence of varying flow pressures from the wells. This may be solved by conducting the well streams via separate stations where the flow pressure is adapted to a common value, after which the streams are brought together in a manifold station for further transport.

The transport of an unprocessed well stream over long distances to shore-based processing plants offers major potential advantages. The placement of as much as possible of the heavier, voluminous processing plant on shore gives one more freedom with respect to optimal design because it is not necessary to cope with the weight and space restrictions presented by permanently installed and, in particular, floating platforms.

In order to transport a well stream over long distances to the shore or to existing processing platforms with available capacity a distance away, it will be necessary to use subsea pumping stations. Their placement on the ocean floor provides several advantages. Compressors and pumps will stand amidst a cooling medium (the sea water) which retains a nearly constant temperature. The risk of explosion is eliminated, and the system will be unaffected by wind, weather and icing. Major savings can be realized in connection with platform costs, housing accommodation costs and transport of personnel and equipment to and from the shore.

Subsea pumping stations are, however, encumbered with several disadvantages and unsolved problems. For example, simple daily inspection and maintenance would be impossible. Systems and components for controlling and monitoring remotely situated subsea stations are untried technology. The necessary electrical energy must be transmitted over long distances, and the connection to the equipment in the subsea station must be done in a satisfactory manner.

All equipment and components must have good quality and high reliability. The maintenance program must be designed in accordance with established systems, with the possibility for replacement of equipment. Assembly and dismounting should be possible by means of unmanned diving vessels and/or hoisting devices controlled from the surface. Service/maintenance, to be carried out by the replacement of complete units, should be possible to carry out at desired intervals of at least 1 to 2 years. Operational control and adjustment should be kept to a minimum, and supervision of the station during operation should preferably be unnecessary.

There is known from NO-PS 162.782 a compressor unit comprising a motor and a compressor, which compressor unit is completely closed on the outside and forms an integrated whole, where the need for shaft seals is greatly reduced. The compressor unit may operate over long periods without supervision and maintenance and can be used in subsea stations for transporting hydrocarbon gas. The motor and compressor are placed in a common drive atmosphere within a pressure shell. The drive atmosphere is formed of the gas that is compressed in a compressor, and it has a pressure level approximately equal to that of the compressor's inlet. A gas line provides communication between a location in front of the compressor's inlet and the inside of the pressure shell, i.e., the drive atmosphere, and a cooling loop is built into this gas line. The motor and compressor have oil lubricated bearings with a lube oil circuit connected therewith, including a lube oil sump open to the drive atmosphere. The purpose of providing the gas line with a built-in cooling loop is to ensure that the condensate does not precipitate in the compressor, but outside it, with return of the condensate to the compressor's inlet side. The necessary chilling in the cooling section is provided by the surrounding sea water.

Also known is a subsea station wherein a separator, a pump unit and a compressor unit are constructed together as a compact unit with the three components arranged in a column structure with the pump unit at the bottom, followed by the separator, and with the compressor unit at the top (U.S. application Ser. No. 07/46098, filed Mar. 1, 1990, and NO patent application no. P890057, respectively.) This compact unit, containing a simple separator, a pump and a compressor, may be placed on the ocean floor. The unit splits the hydrocarbon stream from one or several subsea wells into a gas and liquid phase. The pressure in the gas and liquid is then increased to enable the transport of the production stream over long distances. Transport from the unit may take place either in a common pipeline or in separate pipelines for the oil and gas. The compact unit could be installed by using a drilling rig or, for example, a modified diving vessel with a large moon pool. Installation and/or replacement may be done in a simple manner. Service/maintenance, which would be carried out by the replacement of the complete unit, could be done at desired intervals of at least 1 to 2 years. Operational control and adjustment could be kept to a minimum.

The compact embodiment-form makes it possible to avoid long fluid-carrying lines in the station, thus also making it possible to avoid pressure loss within these lines. The number of necessary valves and couplings is greatly reduced. Because fluid line connections in the station are to a large degree avoided, one also avoids the undesirable effects resulting from so-called slugs, i.e., series of liquid and gas bubbles. Positioning the compressor as the uppermost unit enables self-drainage of the gas. The gas will often remain at the dew point and will therefore readily form condensation within the gas-carrying sections. Any liquid that is formed within the compressor part will run down from the compressor part or the gas part.

The pump unit underneath will be self-draining in the same manner as the compressor unit situated above it. In the same manner as condensed gas drips down from the upper compressor unit, any gas in the pump unit beneath will bubble up in the separator.

The compressor and its motor are arranged within a common pressure shell, the bottom section of which is formed as a reservoir or sump for lube oil for the bearings. Such a compressor represents a closed system, free of external influences. Because operations within the pressure shell may be carried out with the same gas atmosphere and the same pressure in the individual departments, the need for internal sealing (shaft seals) will be nearly eliminated.

SUMMARY OF THE INVENTION

The invention has its point of departure in the known art outlined hereinabove and, more specifically, the invention relates to a compressor system in a subsea station for transporting a well stream, comprising a compressor and a motor in a common drive atmosphere within a pressure shell, a gas chamber and a gas suction line between the gas chamber and an inlet in the compressor, and a lube oil circuit comprising a lube oil sump open to the drive atmosphere, a lube oil pump, bearings in the motor and compressor, and a lube oil line to the bearings.

For placement in surroundings with difficult access, i.e., in a subsea station, it is particularly important to have a compressor aggregate that is as autonomous as possible, with a lifetime or maintenance-free period which is relatively predictable and of maximum length. The lube oil system is particularly important in this connection.

In the compressor system there is, as mentioned previously, a common gas atmosphere. In connection with the transport of a well stream, this gas atmosphere will be a hydrocarbon atmosphere. Said atmosphere fills the gas volumes in the motor, lube oil sump and in the compressor outside the drive shaft seals. The pressure in the drive atmosphere is very close to the lowest pressure in the process side. This minimum pressure is found in the separator (the gas chamber) and in the compressor's suction line.

The lube oil will have a lower temperature than the gas from the separator. The process gas could therefore deliver large amounts of condensate to the lube oil if the gas were not conditioned before passing into the compressor's drive atmosphere. The negative effect of the condensate on the lube oil is the dilution of the lube oil and the consequent loss of its lubricating effect, together with the fact that an excessively high level of liquid could damage the machinery.

According to the invention, it is proposed that the lube oil circuit in a compressor system of the aforementioned type be connected to a lube oil supply on shore or on a platform. This would enable full control of the lube oil system. It is acceptable that some condensate may be taken up by the lube oil during its passage through the lube oil circuit, for such condensate may be removed on the platform (or on shore). A suitable amount of corrosion inhibitor may be added to the lube oil, in a commonly known manner, to prevent corrosion in the compressor.

The invention may be realized, for example, by integrating the lube oil circuit in a lube oil line running from the onshore/platform-based lube oil supply, and back to the onshore/platform-based lube oil supply. When there is a return pipe, for example, the return lube oil can be continually monitored with respect to the content of iron, copper, tin and other metals, thus providing important and easily accessible information relating to control of the state of the system.

A second possibility is to provide for connection of the lube oil circuit with a lube oil pipeline from the onshore/-platform-based lube oil supply, and to have the lube oil circuit in the lube oil sump be connected with the gas chamber, usually the gas chamber in a separator, through an overflow pipe from the lube oil sump and to the gas chamber.

In a possible embodiment of this type, the lube oil will be circulated several times through the compressor, for example 10–50 times, although not more times than will allow the content of condensate to be kept below an acceptable level. Average circulation of the lube oil through the compressor is adjusted by continually tapping a certain amount of lube oil to the gas chamber through the overflow pipe. For example, drawing off 10% will give 10 circulation cycles. The amount of lube oil that is drawn off is replaced by lube oil supplied through the lube oil pipeline from the onshore/platform-based lube oil supply. To the oil being supplied, it is advisable to add a corrosion inhibitor.

DESCRIPTION OF THE DRAWINGS

The invention will now be described in more detail with reference to the drawings, wherein.

DETAILED DESCRIPTION OF THE DRAWINGS

Figure 1:
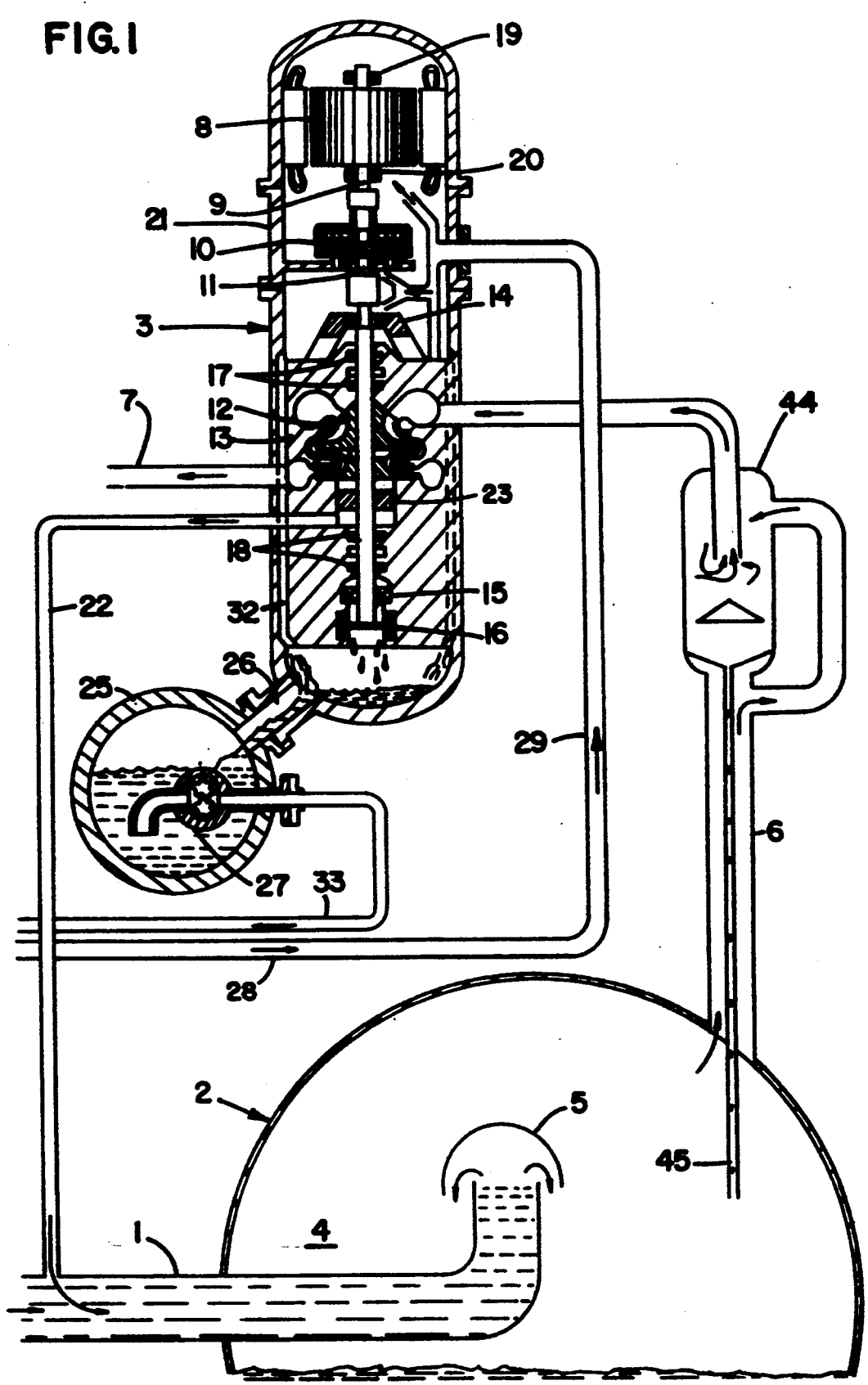
FIG. 1 in semi-schematic form shows a compressor system according to the invention.

The compressor system shown in FIG. 1 is a part of a subsea station for production of hydrocarbons. The system comprises a separator 2 and a compressor 2. A well stream (oil/water/gas/particles) is supplied to the separator 2 through a pipeline 1 from one or more wellheads, not shown, on the ocean floor. Pipeline 1 flows as shown into the gas chamber 4, with splash deflector 5, in the separator 2. A suction line 6 runs from the separator's gas chamber 4 to the compressor 3, where the gas is supplied with transport energy and then proceeds further through line 7.

The compressor 3 is here designed as a vertically oriented centrifugal machine. The compressor's motor 8 is at the top, and the engine shaft 9 is connected to a suitable gear 10, which is in turn connected to the drive shaft 11 of the actual compressor. The compressor shown is a two-stage compressor. The compressor's impeller is indicated by 12 and the compressor housing is designated by 13. The drive shaft 11 of the compressor is mounted at the top in bearing 14 and at the bottom in bearing 15, together with a thrust bearing 16. The compressor shaft 11 is sealed off at the top and bottom of the compressor housing 13 by means of seals 17, 18, here merely indicated.

The motor 8, i.e., its drive shaft 9, is mounted as shown in an upper bearing 19 and a lower bearing 20.

The motor 8, the gear 10 and the compressor housing with the rotor, are arranged as shown within a common pressure shell 21. Within this pressure shell there is a common gas atmosphere, here referred to as the drive atmosphere. Seals 17 and 18 delimit a compressor process atmosphere.

From compressor housing 13 runs an open flow line connection 22 runs, as shown, into pipeline 1, which flows into the separator's gas chamber 4 and supplies a well stream to the separator. Flow line 22 exits from the compressor housing 13 below a balance piston 29 for the compressor's drive shaft. Flow line 22 thus runs from the compressor process atmosphere to the pipeline 1 for the well stream. A lube oil sump 25 has, as shown at 26, an open communication with the interior of the pressure shell 21 and is therefore a part of the drive atmosphere. The lube oil sump 25 is, at the same time, a part of a lube oil circuit which comprises a lube oil pump 27, a supply line 28 and a return pipeline 33. One section of the supply line constitutes a lube oil flow line 29, which runs to the respective bearings in the motor, gear and compressor. The lube oil flow line 29 is distributed, as shown, in branch pipes to the various bearings, although in this case not to the uppermost bearing 19, which here is a self-lubricated bearing. The lube oil collects at the bottom of pressure shell 21. The invention provides for the necessary channels or ducts 32 in this connection.

Before describing in greater detail the mode of operation of the compressor system, it should be mentioned that the gas suction line 6 includes a scrubber 44. From the scrubber chamber runs a return pipe 45, which extends down into the liquid component 41 within the separator. Separator 2 is connected, in a manner not shown, to a pump, which draws liquid from the separator; see, for example, the publicly available Norwegian patent application no. P 890057, mentioned in the introduction herein.

In FIG. 1 the compressor system is shown in its operational mode. Arrows indicate the prevailing flow directions for the well stream, gas and lube oil. The compressor draws gas from the separator's gas chamber 4 through suction line 6. In the scrubber 44 a separation is carried out in known per se manner, and liquid and any drops that are produced are returned to the separator through the return pipe 45. Within the compressor the gas is supplied with energy and sent on through outlet conduit 7. Lube oil for the various bearings circulates in the lube oil circuit with the aid of pressure in supply line 29. The lube oil is collected at the bottom of the pressure shell and runs down into the lube oil sump 25 and is pumped back to the shore/platform through return pipe 39 with the aid of pump 27. The formation of condensate will over a period of time dilute the lube oil and thereby ruin it.

On the land/platform, contaminated lube oil may be treated continually for removal of the condensate. To the lube oil coming from the supply on the shore/platform may be added a suitable amount of corrosion inhibitor to prevent corrosion in the compressor. The return oil may, if desired, be monitored continually with respect to the content of iron, copper, tin and other metals, thereby providing important information for the control of the state of the system.

Figure 2:
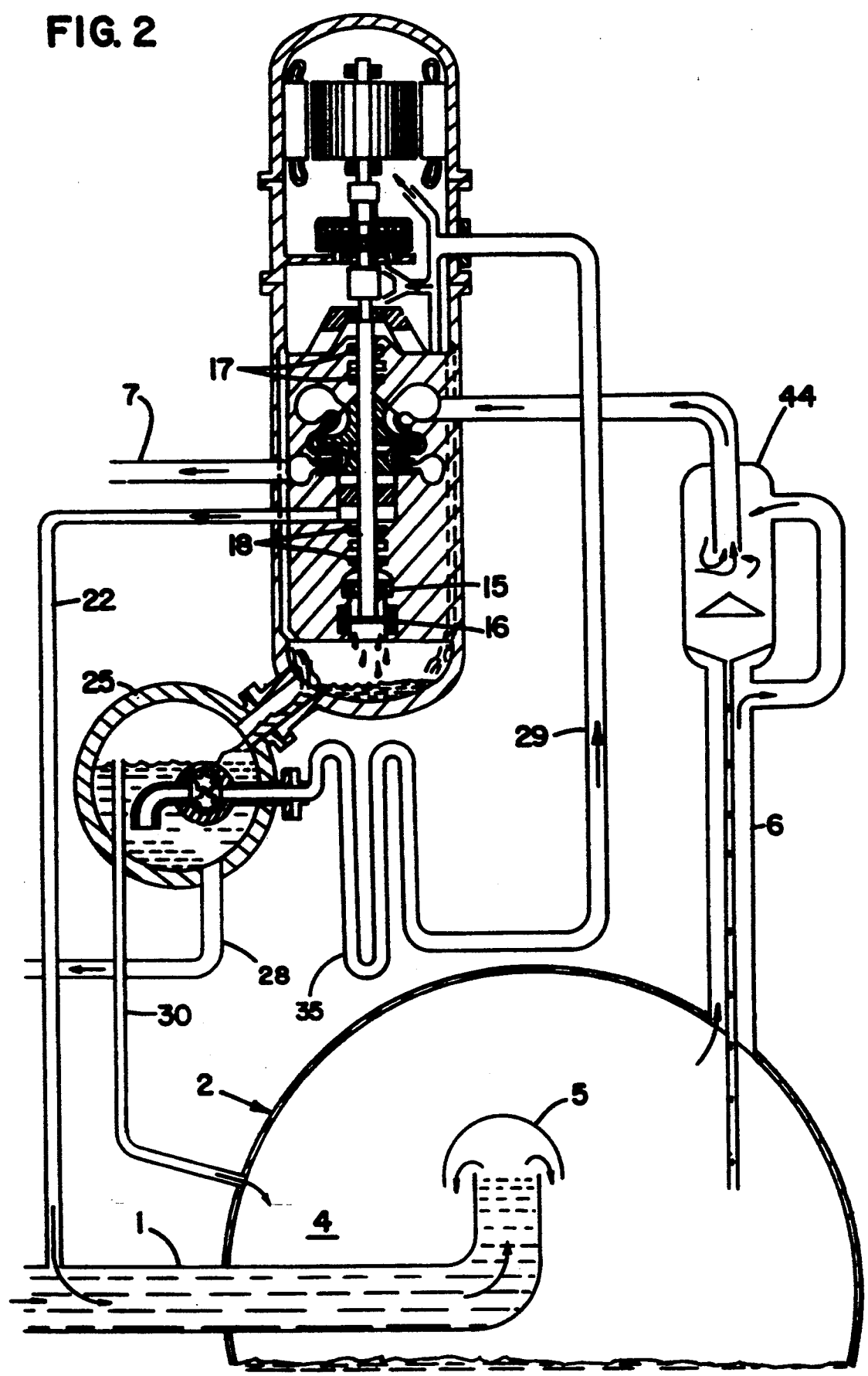
FIG. 2 shows a corresponding compressor system with modified lube oil circuit.

FIG. 2 shows a compressor system that is constructed in essentially the same manner as the system in FIG. 1, and thus, to the degree appropriate, the same reference numerals have been used. The difference between the systems in FIG. 1 and FIG. 2 is that the embodiment in FIG. 2 has an overflow pipe 30 from the lube oil sump 25 and to the separator instead of the return pipe. Supply line 28 goes to the lube oil sump. A cooling loop 95 has been built into line 29.

In the embodiment in FIG. 2, the lube oil circulates several times through the compressor, but not so many times as to enable the content of condensate to rise above an acceptable level. Average circulation of lube oil through the compressor is adjusted by continual tapping of a certain amount of the lube oil to the separator through the overflow pipe. The oil drawn off is replaced by lube oil supplied from the shore/platform. It is recommended that corrosion inhibitor be added to the oil that is supplied.

What is claimed is:

1. A compressor system in a subsea station for transporting a well stream, comprising:
    a pressure shell, the pressure shell enclosing a compressor, the compressor including an inlet and an outlet, and a means for driving the compressor including a shaft operatively connected to a motor and the compressor, the shaft including bearings proximate to the motor and the compressor;
    a gas chamber;
    a gas suction line in communication with compressor inlet and the gas chamber; and
    a lube oil circuit in communication with the pressure shell, for supplying lube oil to the bearings, the lube oil circuit including sump, a pump, and a remote lube oil supply.

2. The compressor system of claim 1, wherein the lube oil circuit further includes a lube oil line in communication with the remote lube oil supply for carrying lube oil to and from the remote lube oil supply.

3. The compressor system of claim 1, wherein the lube oil circuit further includes a lube oil supply line in communication with the remote lube oil supply and the pressure shell, and an overflow pipe in communication with the sump and the gas chamber.

4. The compressor system of claim 1, wherein the remote lube oil supply is located on shore.

5. The compressor system of claim 1, wherein the remote lube oil supply is located on a platform.

* * * * *

UNITED STATES PATENT AND TRADEMARK OFFICE
CERTIFICATE OF CORRECTION

PATENT NO. : 5,398,762
DATED : March 21, 1995
INVENTOR(S) : Kjell O. Stinessen

It is certified that error appears in the above-identified patent and that said Letters Patent is hereby corrected as shown below:

In column 1, line 4, after "STREAM", insert the heading:
    --FIELD OF THE INVENTION--.

In column 1, line 14, after "bearings", insert the heading:
    --BACKGROUND OF THE INVENTION--.

In column 1, line 18, ":" should be --.--.
In column 2, line 24, "011" should be --oil--.
In column 3, line 44, "07/46098" should be --07/46038--.
In column 5, line 46, "2" should be --3--.
In column 6, line 13, "29" should be --23--.
In column 6, line 55, "39" should be --33--.
In column 7, line 5, insert --2,-- after the word "separator".
In column 7, line 21 (claim 1), the "," should be --;--.
In column 7, line 23 (claim 1), after "compressor" insert --;--.

Signed and Sealed this

Twenty-sixth Day of December, 1995

Attest:

BRUCE LEHMAN

*Attesting Officer*     *Commissioner of Patents and Trademarks*